United States Patent

Roberts

[11] Patent Number: 5,515,722
[45] Date of Patent: May 14, 1996

[54] GAS METER WITH UNITARY CENTRAL CORE DEFINING MULTIPLE FLOW PASSAGES

[75] Inventor: John A. Roberts, Camberley, England

[73] Assignee: Smith Meters Limited, London, England

[21] Appl. No.: 373,230

[22] PCT Filed: Jun. 30, 1993

[86] PCT No.: PCT/GB93/01364

§ 371 Date: Feb. 17, 1995

§ 102(e) Date: Feb. 17, 1995

[87] PCT Pub. No.: WO94/01740

PCT Pub. Date: Jan. 20, 1994

[30] Foreign Application Priority Data

Jul. 14, 1992 [GB] United Kingdom .................. 9214876

[51] Int. Cl.[6] ....................................... G01F 3/20
[52] U.S. Cl. ................................. 73/263; 73/262
[58] Field of Search .................. 73/861, 861.47, 73/262, 263, 264, 268, 269, 703, 715, 716

[56] References Cited

U.S. PATENT DOCUMENTS

| | | | |
|---|---|---|---|
| 1,804,596 | 12/1931 | Dickinson | 73/262 |
| 2,619,940 | 12/1952 | Leroy | 73/263 |
| 3,808,886 | 5/1974 | Goldsberry | 73/264 |
| 4,091,668 | 5/1978 | Namikawa et al. | 73/263 |
| 4,593,562 | 6/1986 | Carte et al. | 73/266 |

Primary Examiner—Richard Chilcot
Assistant Examiner—Max H. Noori
Attorney, Agent, or Firm—Bacon & Thomas

[57] ABSTRACT

A dry gas meter includes a unitary core which functions as the meter casing and defines the inner sides of two gas chambers, a valve gear chamber, an index housing and multiple gasways. A central partition of the core has angled wall portions which provide dished sides for the gas chambers. The gas chambers are further defined by diaphragm carrying pan covers. These pan covers and upper and lower covers complete the body of the meter. Between the angled wall portions, gasways extend from a gas inlet formed in the lower cover to the interior of a valve gear chamber.

8 Claims, 5 Drawing Sheets

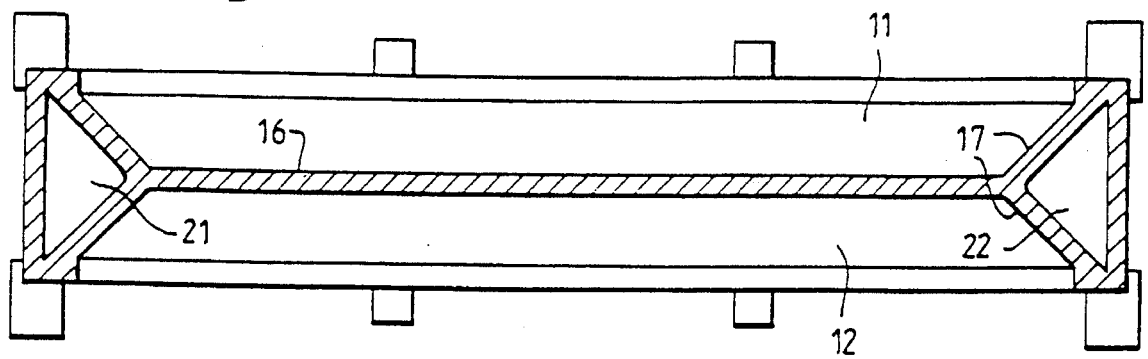
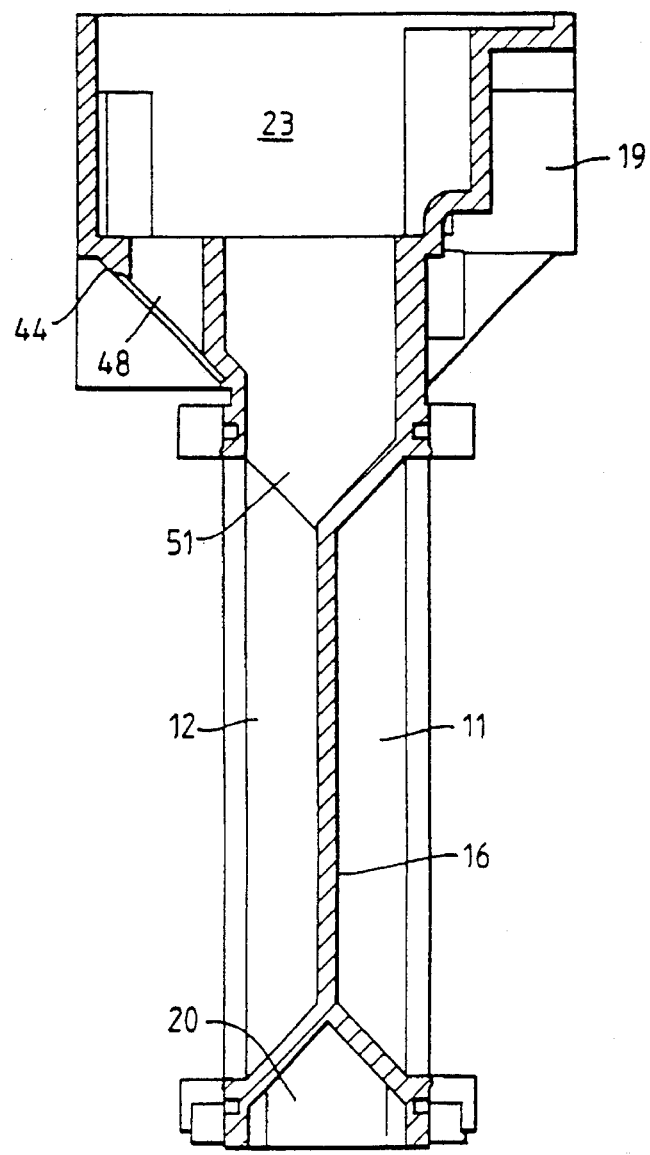

GAS METER WITH UNITARY CENTRAL CORE DEFINING MULTIPLE FLOW PASSAGES

BACKGROUND OF THE INVENTION

1. Field of the Invention

This invention relates to a dry gas meter of the kind in which flexible diaphragms work back-and-forth in chambers to which the gas being metered is alternately admitted and exhausted. Such meters will be termed hereinafter "meters of the kind described".

2. Discussion of the Prior Act

Conventionally meters have had their working parts located in an external casing. For example DE-A-1473042 shows upper and lower external casing parts secured together by flanges adjacent the midheight of the meter and enclosing all the meter parts. Similarly DE-A-2756163 shows meter parts which are intended to be included in an external casing. DE-C-733288 shows a simple meter which may have no external casing but does not have a unitary core defining first, second and third chambers in accordance with those of the present invention.

FR-A-1466742, which is regarded as the closest prior art, comprises a unitary core defining first, second and third chambers. However, it is not clear that this meter is not intended to have an outer casing and there is no fourth lower chamber and lower cover member.

It is desired that meters of the kind described be made smaller, neater and of simpler construction without loss of strength of durability.

SUMMARY OF THE INVENTION

The invention provides a meter of the kind in which flexible diaphragms work back-and-forth in first and second chambers to which the gas being metered is alternately admitted and exhausted by valve means, the oscillations of the diaphragms being translated through an index drive means for counting to give an indication of the volume of gas which has passed through the meter, the meter being formed by a core providing in one piece the structure for the inner halves of the first and second chambers and also providing a third upper chamber for the valve means and the index drive means; first gasways connecting the first and second chambers to the third chamber; an upper cover for closing the third chamber and defining an outlet means; two separate pan covers attached to the core to complete the first and second chambers; by second gasways defined by the core and extending from adjacent the bottom of the core to the third chamber for connecting a gas inlet means at the bottom of the meter to said third chamber; and wherein the upper cover and a lower cover form the top and bottom respectively of the meter casing with the core and pan covers forming the outer sides of the meter casing, there being no further external casing.

Such a meter can be made small and provides for the quick and easy assembly of the meter, wherein the operation of attaching the pan covers completes the gasway connections to the pans which are otherwise integral in the core. Since no outer casing is needed, the time and difficulty of the assembly is very much reduced.

BRIEF DESCRIPTION OF THE PREFERRED EMBODIMENT

A specific embodiment of the invention is shown in the accompanying drawings, in which:

FIG. 4 is a horizontal section on the line IV—IV of FIG. 3, FIG. 5 is a vertical section on the line V—V of FIG. 3.

DETAILED DESCRIPTION OF THE PREFERRED EMBODIMENT

Figure 1:
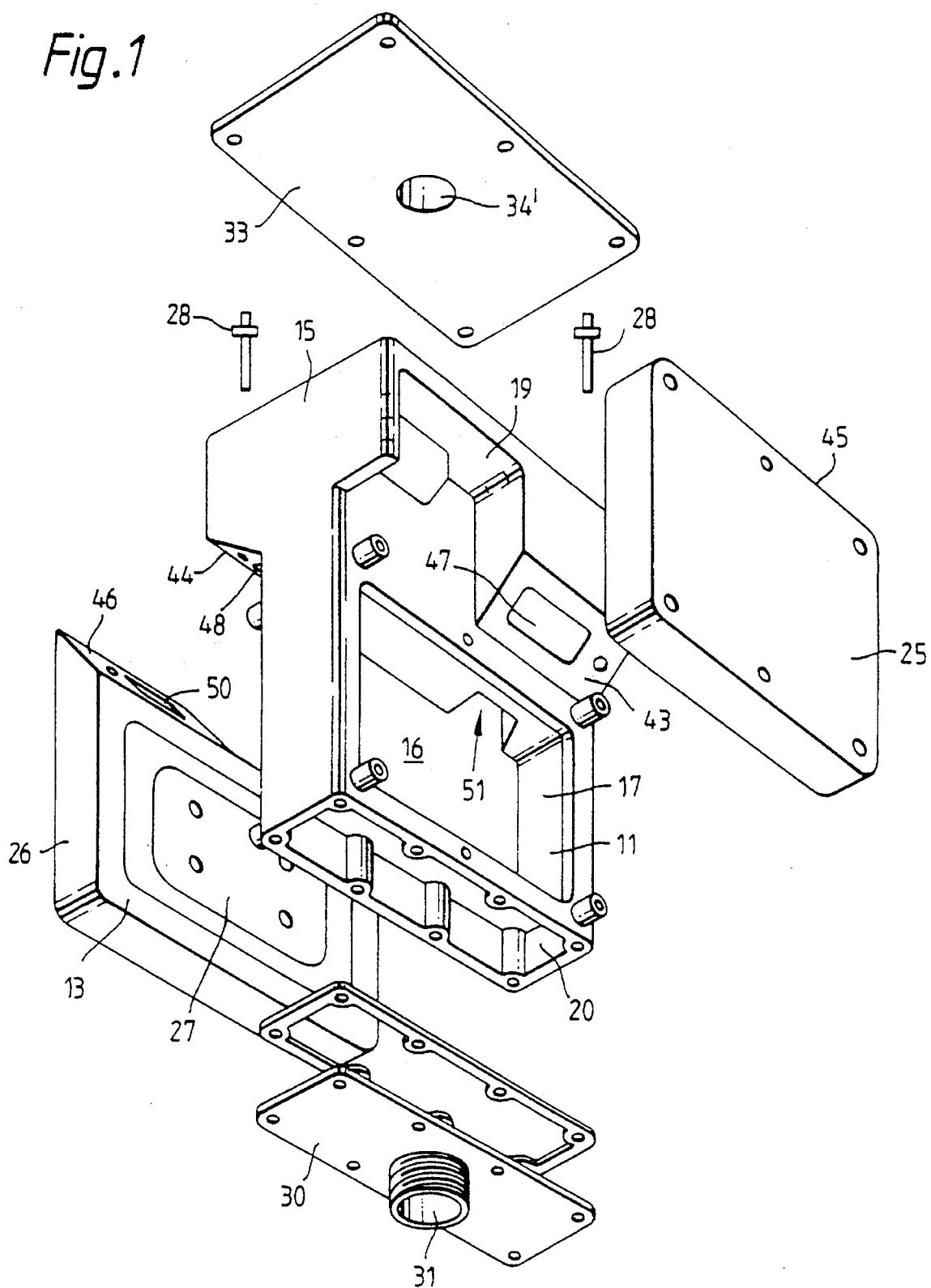
FIG. 1 is an exploded perspective view of the main components of a gas meter.

The gas meter comprises two chambers (11, 12) each divided vertically by a flexible diaphragm (13) so that gas being measured may be alternately admitted and exhausted from either side of the diaphragm, causing it to oscillate back-and-forth. As is usual, the oscillations of the diaphragm are counted to provide a measure of the volume of gas which has passed through the meter.

As seen best in FIG. 1, the meter body is defined by a unitary core (15) which is a complex aluminium die casting providing structure functioning as the meter casing, inner gas chamber, valve gear container, index housing and gasways, as described hereinafter in more detail. The core comprises a central vertical partition (16) comprising one side of each of the chambers (11, 12), and two angled walls (17) on either side of the partition each forming one dished shape of a chamber. The upper end of the core forms a recess (19) opening to the side which is the index housing, and an irregular housing (23), [FIGS. 3 and 5] opening to the top which houses valves, valve drive gear, and index drive means.

Figure 3:
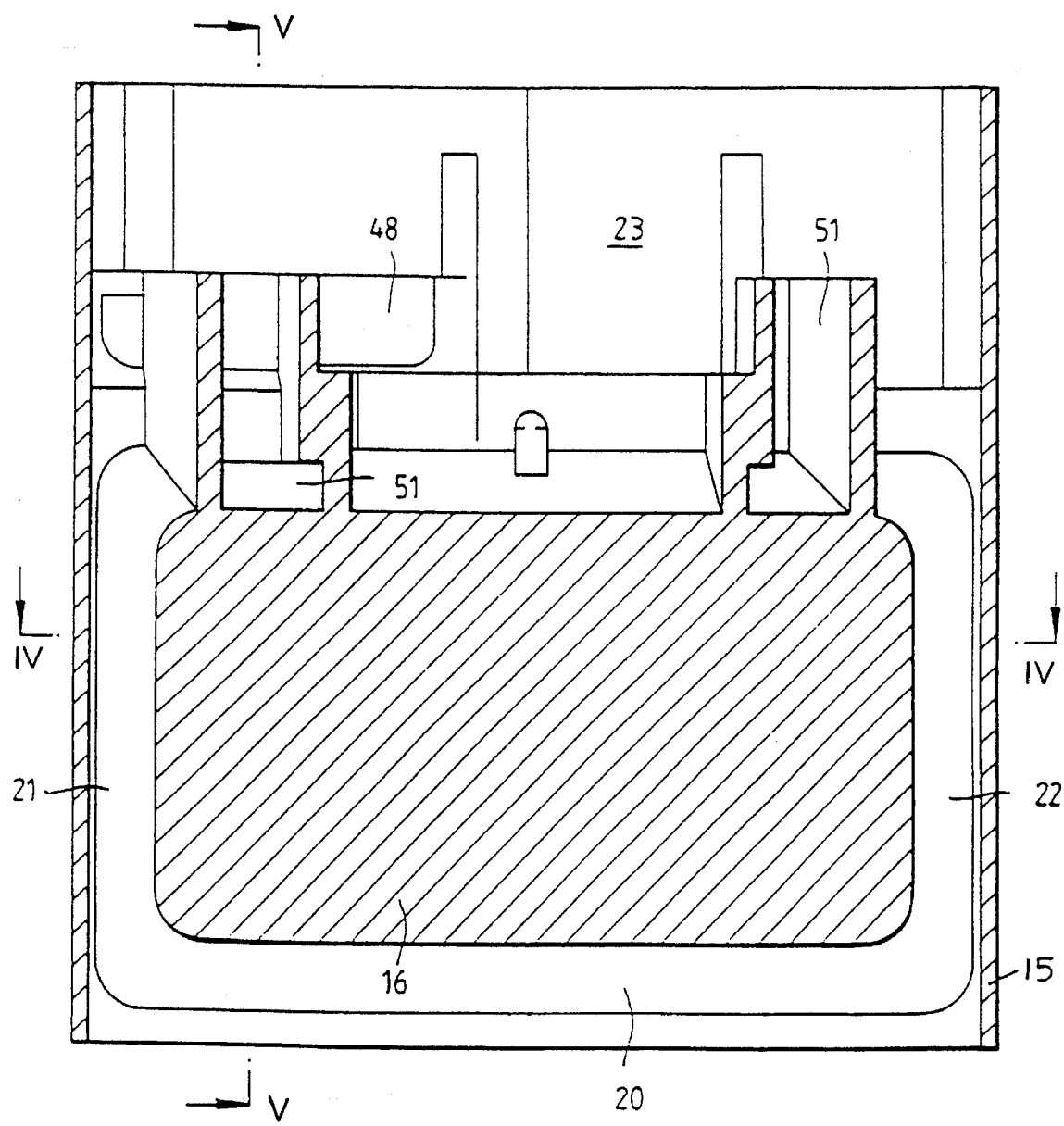
FIG. 3 is a vertical section through a central unitary part of the meter of FIG. 1.

The lower end of the core forms a housing (20) across the core connecting at each side with vertically-extending, triangular-section gas inlet gasways (21, 22), seen best in FIGS. 3 and 4. These gasways lie in between the angled walls (17) using space which would otherwise be wasted.

Figure 6:
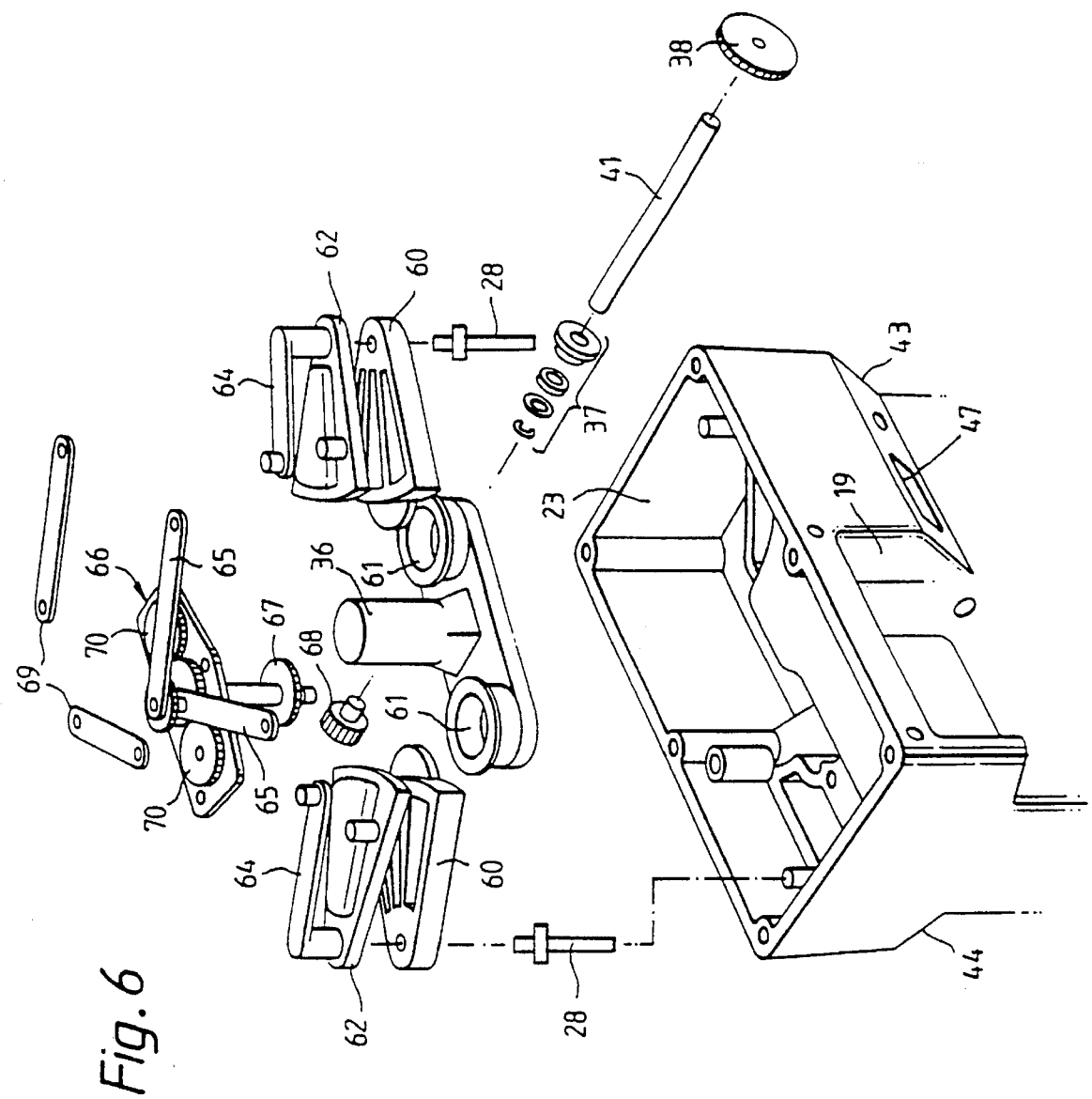
FIG. 6 is an exploded perspective view from the upper end of the gas meter of FIG. 1.

The two chambers are completed by cast aluminium outer pans (25, 26) [FIG. 1], each having a flexible diaphragm (13), and both secured to the core (15). Each diaphragm has a central disc (27) secured by a flag am to a flag (28) [FIG. 6] extending into housing (23) to drive the valve drive gear and index drive means.

The lower housing (20) is closed by a cast aluminium lower cover (30) [FIG. 1 ] having a central bossed gas inlet (31) which communicates with housing (20) and gasways (21, 22). The upper housing (23) is closed by a cast aluminium upper cover (33) having a central bossed gas outlet (34) which communicates with an exhaust tube (36) [FIG. 6] in housing (23).

Figure 2:
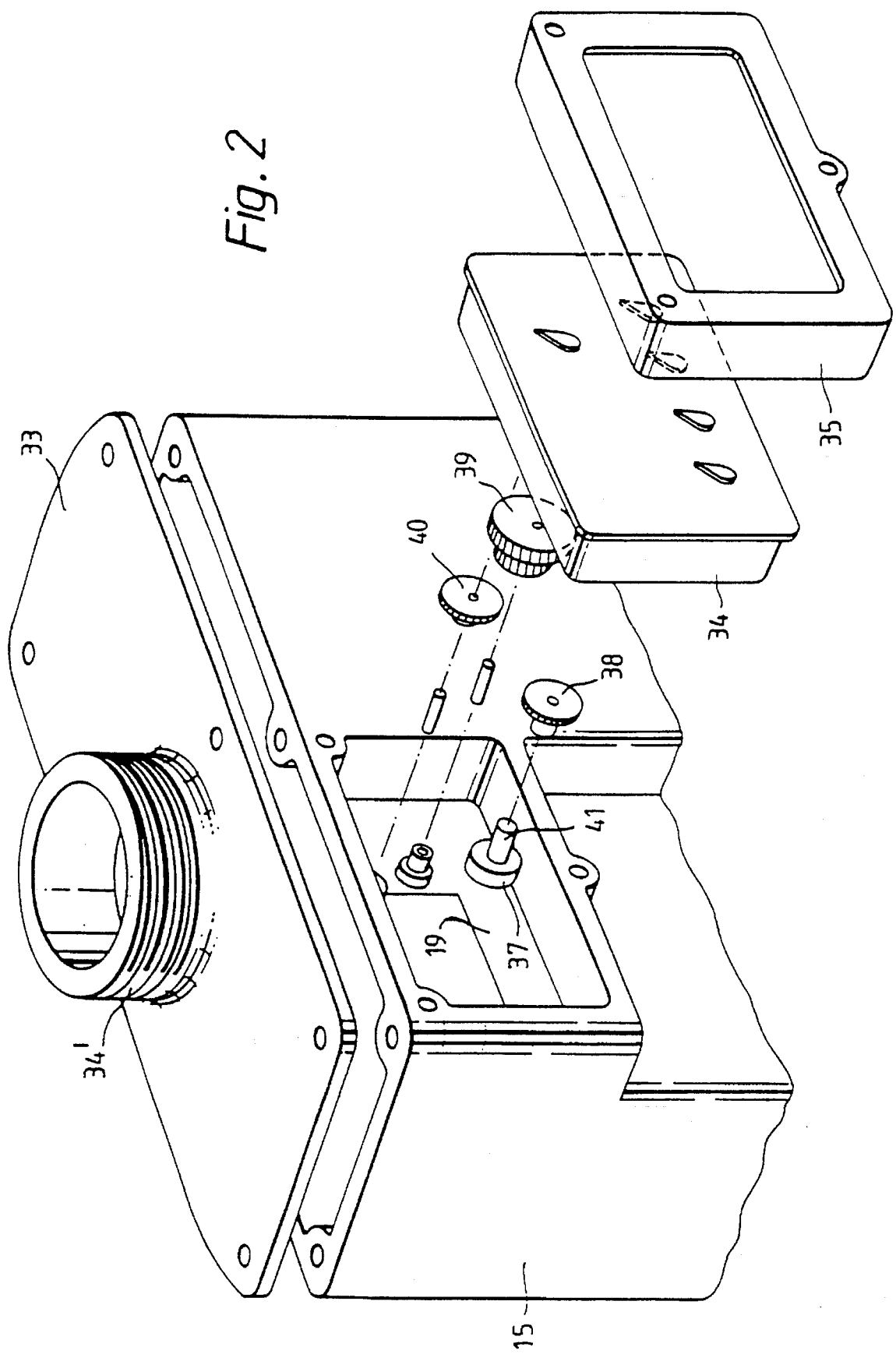
FIG. 2 is an exploded perspective view of the upper part of the meter of FIG. 1.

The index housing (19), as best seen in FIG. 2, houses an index assembly (34) and has a cover (35) having a viewing plate through which the meter reading can be read. A sealed bush bearing (37) in the rear wall of the housing allows a lay shaft (41) [seen also in FIG. 6] passage to drive an output gear (38) and through it change gear (39) and index drive gear (40), which operates the index assembly (34) to count the oscillations of the diaphragms.

Adjacent each outer pan (25, 26), the core (15) has an angled face (43, 44) [FIG. 1], which mates with a similarly angled face (45, 46) on the corresponding outer pan. Gasways (47, 48) in the core connect with ports (50) in the faces (45, 46) into the interior of the pans on the outer side of diaphragms (13).

On the inner side of the diaphragms (13) the core provides gasways (51), also connected to the interior of the chambers (11, 12).

Gasways (51, 48, 47) all extend up through the core and through a lower wall of upper housing (23) ending in the same plane as seen best in FIG. 3. Exhaust tube (36) [FIG. 6] is forked to provide a pair of entrances (61) and the tube is mounted so that these lie in the same plane as the entries to gasways (51, 48, 47). A valve grating (60) [FIG. 6] for each chamber (11, 12) covers the two gasways to either side of the diaphragm and one of the exhaust tube entrances (61). Inlet gasways (21) and (22) open into the upper housing (23) so that it is at all times filled with the gas being metered. An oscillating valve cover (62) for each valve grating alternately admits gas from housing (23) to either side of the diaphragm and exhausts it from the chambers into exhaust tube (36) and out of outlet (34'). Thus the flowing gas is forced to move the diaphragms back-and-forth and oscillate flags (28). Flags (28) drive top arms (64) which are connected to cranks (65) to rotate a gear box (66). Gear (67) driven by the gearbox connects with output gear (68) which rotates layshaft (41) which, as discussed above, drives the index.

Cover drive arms (69) are driven from gears (70) of the gearbox and connected to the valve covers (62) to oscillate them as described above.

It will be noted that the meter design is distinguished by a particularly efficient use of space so that the overall size is kept to a minimum. The two pan covers (25) and (26) fit neatly against the core, their outer surfaces being flush with the outer surfaces of the upper part of the core. Moreover, the spaces between the outer edges of the chambers, which are usually wasted, have been used here to provide inlet gasways (20, 21, 22) which thus do not add to the overall size of the meter. This is most conveniently effected by the core being a die casting allowing all the passageways to be preformed without extra paths or assembly work.

Since the pan covers, the top cover and the lower cover are all rigid aluminium castings, the core and its covers are all of strong and durable enough construction to need no outer casing for protection, this also contributing in major part to the reduced size of the meter.

The assembly of the meter is also very much simplified by the use of the unitary core. In assembly, the pan covers and diaphragm and flag structures are separately put together and then secured to the core. The lower cover is secured in position, thus completing all the gasway connections. The valves and drive gear are assembled in housing (23) and the upper cover secured over the top. The index is then assembled and attached into the index housing. No casing operations as such are required, the unitary core, pan covers and upper and lower covers together forming the outer surfaces of the meter.

I claim:

1. A gas meter comprising:

a unitary central core including first and second end portions, said core defining first portions of first and second chambers between said first and second end portions, and a third chamber located at said second end portion;

a first pan cover attached to said core and defining a second portion of said first chamber;

a second pan cover attached to said core and defining a second portion of said second chamber;

first and second flexible diaphragms movably mounted in said first and second chambers respectively;

a plurality of first gasways respectively interconnecting said first and second chambers with said third chamber, at least a portion of each of said plurality of first gasways being formed as part of said core;

valve means, located in said third chamber, for alternately admitting and exhausting a gas on opposing sides of said diaphragms to cause said diaphragms to oscillate;

index drive means interconnected with said diaphragms such that oscillations of said diaphragms shift said index drive means to provide an indication of the volume of gas passing through said meter, said index drive means being located, at least in part, in said third chamber;

a first cover secured at and closing the first end portion of said core;

a gas inlet provided at the first end portion of said core;

second gasways extending from said first end portion to said third chamber thereby connecting said gas inlet to said third chamber, said second gasways being defined by said core;

a gas outlet opening into the third chamber; and a second cover secured at the second end portion of said core and closing said third chamber, wherein outer portions of said core, said first and second pan covers and said first and second covers define outer sides of said gas meter.

2. The gas meter as claimed in claim 1, wherein each of said first and second pan covers includes a port connected with a respective one of said first gasways.

3. The gas meter as claimed in claim 1, wherein said gas inlet is formed in said first cover, said core further defining a fourth chamber communicating with said gas inlet and said second gasways.

4. The gas meter as claimed in claim 3, wherein said core further comprises a central partition forming one side of each of the first and second chambers, said central partition including angled walls, said second gasways opening at said angled walls.

5. The gas meter as claimed in claim 1, wherein said core further comprises an index chamber, said index drive means being located, at least in part, in said index chamber, said gas meter further comprising a viewing plate extending over said index chamber.

6. The gas meter as claimed in claim 1, wherein said gas outlet is formed in said second cover and communicates with a forked exhaust tube located in said third chamber, said forked exhaust tube defining a pair of entrances associated with said valve means.

7. The gas meter as claimed in claim 1, wherein said core is die casted of aluminum.

8. The gas meter as claimed in claim 1, wherein said first and second diaphragms are carried by said first and second pan covers respectively.

* * * * *